(12) United States Patent
Peng et al.

(10) Patent No.: US 7,651,047 B2
(45) Date of Patent: *Jan. 26, 2010

(54) CABLE STORAGE DEVICE

(75) Inventors: Robin Peng, South Jordan, UT (US); C. Cameron Bigler, Orem, UT (US)

(73) Assignee: Jupiter IP, LLC, Sandy, UT (US)

( * ) Notice: Subject to any disclaimer, the term of this patent is extended or adjusted under 35 U.S.C. 154(b) by 40 days.

This patent is subject to a terminal disclaimer.

(21) Appl. No.: 11/686,432

(22) Filed: Mar. 15, 2007

(65) Prior Publication Data

US 2007/0215375 A1 Sep. 20, 2007

Related U.S. Application Data

(60) Provisional application No. 60/743,583, filed on Mar. 20, 2006.

(51) Int. Cl.
*B65H 75/28* (2006.01)
*B65H 75/14* (2006.01)
*B65H 75/38* (2006.01)

(52) U.S. Cl. ............ 242/587.2; 242/388; 242/587; 242/118.4; 242/118.7

(58) Field of Classification Search ............ 242/125, 242/125.1, 125.2, 125.3, 138, 140, 587, 587.2, 242/388.2, 579, 580, 118.4, 118.7, 407, 610.6, 242/614, 900, 388
See application file for complete search history.

(56) References Cited

U.S. PATENT DOCUMENTS

| | | | | |
|---|---|---|---|---|
| 571,761 A | * | 11/1896 | Gulliford | 24/129 A |
| 1,274,776 A | * | 8/1918 | Preissner | 242/125.2 |
| 1,324,171 A | * | 12/1919 | Propst | 242/125.2 |
| 1,913,508 A | * | 6/1933 | Phillips | 242/587.1 |
| 2,566,334 A | * | 9/1951 | Jamrozy | 242/125.2 |
| 2,587,707 A | * | 3/1952 | Dever | 242/388 |
| 2,648,472 A | * | 8/1953 | Gallagher et al. | 223/109 R |
| 3,743,210 A | * | 7/1973 | Hawley | 242/125.1 |
| 3,757,626 A | * | 9/1973 | Kulp | 83/542 |
| 4,602,751 A | * | 7/1986 | Vogel | 242/118.4 |
| 4,938,432 A | * | 7/1990 | Kurt et al. | 242/580 |
| 5,255,866 A | * | 10/1993 | Campolo | 242/388.1 |
| 5,687,924 A | * | 11/1997 | Reiche et al. | 242/127 |
| 6,517,022 B1 | | 2/2003 | Bailey | |
| 6,863,236 B2 | | 3/2005 | Kempf et al. | |
| 2003/0010862 A1 | | 1/2003 | Buyce et al. | |
| 2005/0077421 A1 | * | 4/2005 | Hernandez et al. | 242/587.2 |
| 2007/0138330 A1 | * | 6/2007 | Ellis | 242/388.1 |

\* cited by examiner

*Primary Examiner*—John Q Nguyen
*Assistant Examiner*—Stefan Kruer
(74) *Attorney, Agent, or Firm*—Geoffrey E. Dobbin

(57) ABSTRACT

The present invention relates to an improved cable storage device. Stored cables may be of any type, form electrically conductive wires to curtain drawstrings. The cable management device includes first and second expanded regions, a medial region, and at least one channel with a resealable slit. The first and second expanded regions are respectively wider than the medial region. The at least one channel includes an opening on the first region, an opening on the medial region, and an internal cavity therebetween. The internal cavity may be intentionally exposed via a resealable slit to allow a cable to be routed between the openings. Upon release, slit automatically reseals, thereby reliably supporting the cable in the internal cavity. A second embodiment includes two such channels, one in each expanded region.

12 Claims, 6 Drawing Sheets

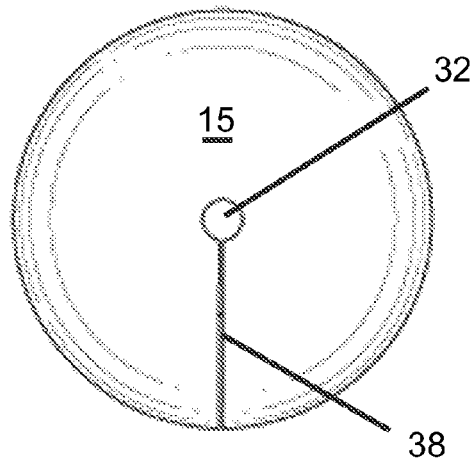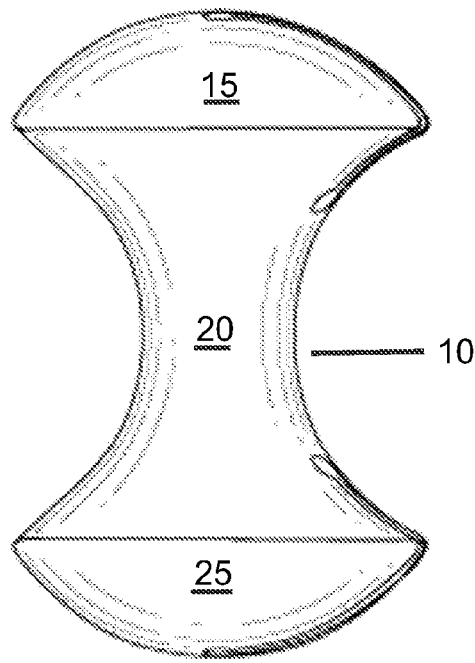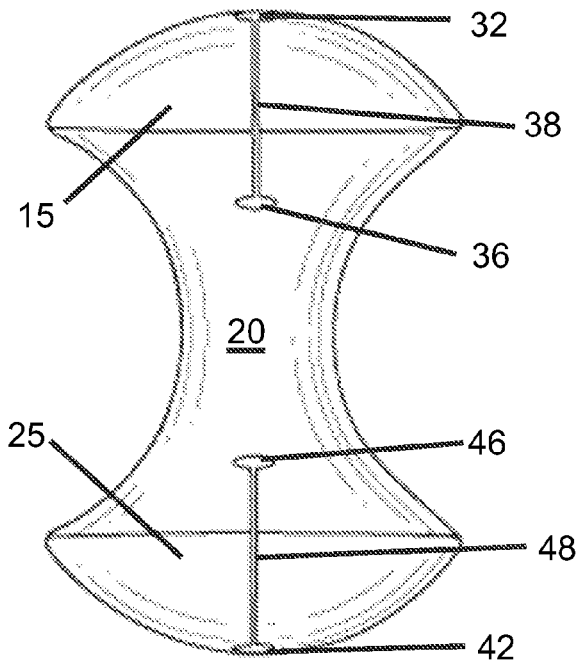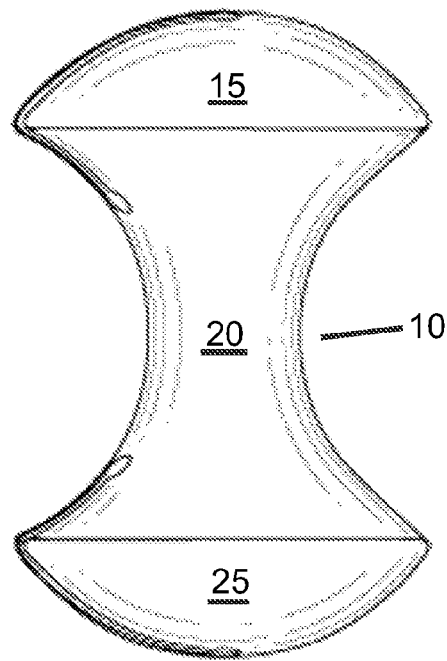
Fig. 1
Fig. 2
Fig. 3
Fig. 4

CABLE STORAGE DEVICE

CROSS-REFERENCES TO RELATED APPLICATIONS

The Present Application claims priority on prior filed U.S. Provisional Application 60/743,583, filed Mar. 20, 2006. This prior Provisional Application is incorporated in its entirety herein by reference.

FIELD OF THE INVENTION

The invention generally relates to an improved cable storage device. In particular, the present invention relates to an inline cable attachment system to facilitate cable storage.

BACKGROUND OF THE INVENTION

Electronic devices have become increasingly important for performing a variety of functions. All electronic devices require electricity to be transmitted between various locations for various purposes. For example, electricity may be used to provide power to a device or to transmit data to a user. Electricity is conventionally transmitted via conductive materials that have a low electrical resistance, therefore facilitating transportation of electrons. In order to avoid interference, electrical conductors must be shielded. Shielded elongated sections of electrical conductors are commonly referred to as cables, wires, cords, etc. In addition to electricity, many modern electrical devices may also use light or sound to transmit data from one location to another. Light tubes or fibers contain light within an elongated hollow structure using principles of total internal reflection to facilitate transmission between locations. Likewise, sound may be transmitted from one location to another by using insulated elongated structures. One of the inherent problems with data transmission is the disorganization often caused by cables and other elongated transmission systems.

Many cable winding, stacking, and clipping systems and devices have been developed to assist in managing these elongated structures. However, many of the devices require the cables to be bent or overlapped at relative angles of greater than ninety degrees and occasionally approaching 180 degrees. This type of bending or stacking can affect the properties of a cable and over time may result in data corruption or transmission failure. Other systems and devices are unnecessarily large, essentially replacing the existing disorganized cable with an unsightly cable wrapping apparatus. And still other systems do not reliably maintain the cable organization they are designed to create. For example, certain cable structures exhibit resilient memory type properties and often unwind or unfasten from an otherwise secured position on a winding device.

Therefore, there is a need in the industry for a cable management device that overcomes the limitations of existing devices to provide a reliable system for cable organization.

It should be noted that other types of non-conductive cords, such as strings and ropes, present their own management problems and a device meeting the needs of electrical and other transmitting cables could also suffice for non-conductive cords.

SUMMARY OF THE INVENTION

The present invention relates to an improved cable storage device. One embodiment of the present invention relates to an inline cable attachment system to facilitate cable storage. The cable management device is generally shaped in the three dimensional form of an apple core, hourglass or dumbbell. The cable management device includes a first and second expanded regions, a medial narrow region, and at least one channel with a resealable slit. The first and second expanded regions are respectively wider than the medial narrow region. The at least one channel includes an opening on the first region, an opening on the medial region, and an internal cavity therebetween. The internal cavity is intentionally exposed via a resealable slit to allow a cable to be routed between the openings. Upon release, the slit will reseal due to the elastomeric qualities of the material from which the device is made, thereby reliably supporting the cable in the internal cavity of the channel. A second embodiment includes two such channels and slits, one between the first expanded region and the medial region, and a second independent channel between the second expanded region and the medial region.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The following description of the invention can be understood in light of the Figures, which illustrate specific aspects of the invention and are a part of the specification. Together with the following description, the Figures demonstrate and explain the principles of the invention. The Figures presented in conjunction with this description are views of only particular—rather than complete—portions of the systems and methods of making and using the port system according to the invention. In the Figures, the physical dimensions may be exaggerated for clarity. The same reference numerals in different drawings represent the same element, and thus their descriptions will be omitted.

FIG. 1 is a top plan view of one embodiment of the invention.

FIG. 2 is a left side plan view of the device of FIG. 1.

FIG. 3 is a front plan view of the device of FIG. 1, illustrating two channels with resealable slits.

FIG. 4 is a left side plan view of the device of FIG. 1.

DETAILED DESCRIPTION OF THE INVENTION

With reference now to the drawings, the preferred embodiment of the application tool is herein described. It should be noted that the articles "a", "an", and "the", as used in this specification, include plural referents unless the content clearly dictates otherwise.

The present invention relates to an improved cable storage device. One embodiment of the present invention relates to an inline cable attachment system to facilitate cable storage. The cable management device includes a first and second expanded regions, a medial narrow region, and at least one channel. The first and second expanded regions are respectively wider than the medial narrow region. As such, the cable management device is generally shaped in the three dimensional form of an apple core, hourglass, dumbbell, or other similar shape. The at least one channel includes an opening on the first region, an opening on the medial region, and an internal cavity therebetween and a resealable slit extending therefrom. The resealable quality is generally derived from the elastomeric qualities of the material from which the device is made. The internal cavity may be intentionally exposed via the resealable slit to allow a cable to be routed between the openings. Upon release, the slit reseals, thereby reliably supporting the cable in the internal cavity. A second embodiment includes two such channels, one between the first expanded region and the medial region, and a second independent channel between the second expanded region and the medial region.

The following terms are defined as follows:

Cable—Cable refers to any elongated electrical, optical, or sound transmission line including but not limited to wires, cables, cords, fibers, tubes, etc. The term also includes non-conductive lines, such as string, rope, or drawstrings.

In-line—An in-line device is one which may be removably attached at any point on a cable.

Drawstring—Any elongated flexible structure extending from a window covering for purposes relating to selectively covering a window, or any similar structure extending from a device for operation of said device in a similar manner.

Figure 15:
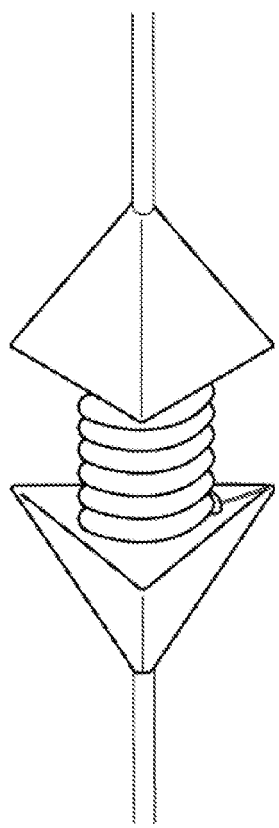
FIGS. 15-22 are all perspective views of alternate shapes for the device.
Figure 16:
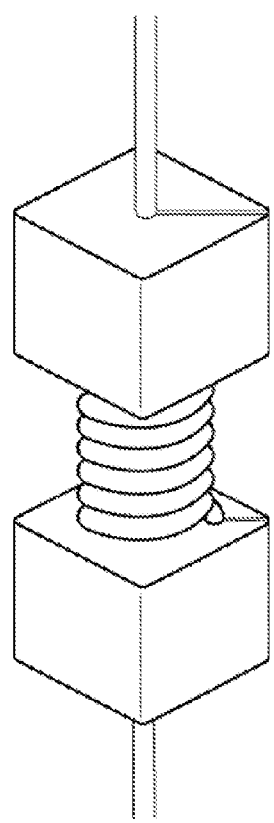
Figure 17:
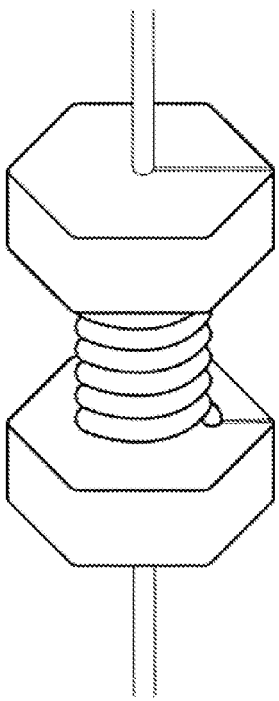
Figure 18:
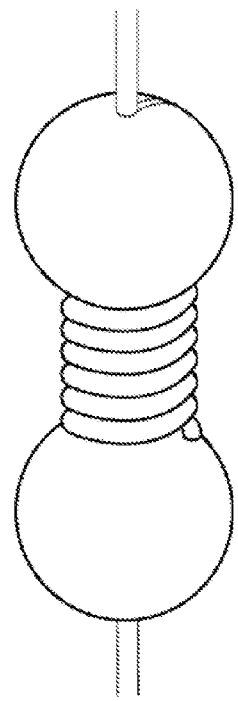
Figure 19:
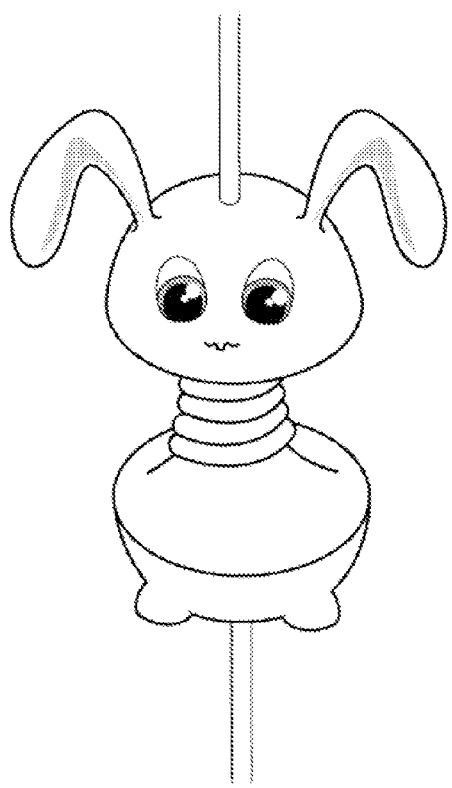
Figure 20:
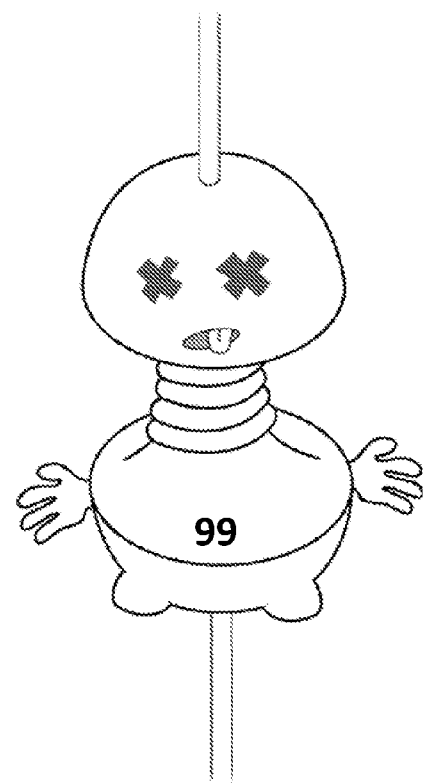
Figure 21:
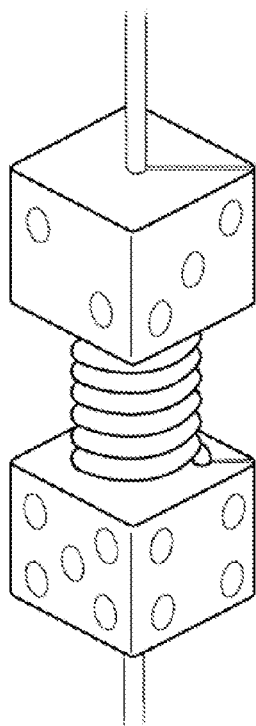
Figure 22:
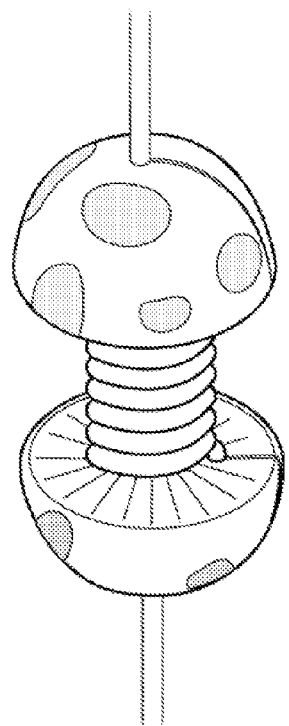

Reference is initially made to FIGS. 1 through 6, which illustrates a various views of one embodiment of the cable management device of the present invention in operation, designated generally at 10. As illustrated, the device 10 is three dimensionally shaped in the form of a apple core, hourglass, or dumbbell in that it includes two expanded or bulbous regions 15, 25 and a narrow medial region 20. It should be noted that any shape for the first and second expanded regions 15, 25 may be used, the only requirement is that they have a larger cross-sectional area than the medial region 20. As such, two possible shapes, an "applecore" 10 and a "dumbbell" 70 (FIGS. 7-12) are illustrated as preferred examples only. Other shapes, such as spheres (FIG. 18), hemispheres (FIG. 22), cubes (FIG. 16), pyramids (FIG. 15), octahedrons (FIG. 17), decahedrons dodecahedrons or any three dimensional construct, may be used. Novelty shapes and designs, such as an animal (FIG. 19), dice (FIG. 21), rival sports team's mascot (FIG. 20), or the mushrooms as shown in FIG. 22, may also be used and present enhanced visual aesthetics. The first and second expanded regions do not even have to be of the same shape, as shown in FIGS. 19 and 20. Since the device is, in its preferred embodiment, a molded rubberized plastic, the overall shape and appearance of the device is limited only by imagination and the size requirement. The size of the device as a whole may be as small as necessary to wind an earphone cord about itself or as large as needed to store large lengths of fiber optic cable. As such, the illustrations should not be seen as limiting and any other shape and size that performs the same function should be seen as equivalent. The device 10 further comprises a first channel 30, and a second channel 40. The first channel 30, located within the first expanded region 15, comprises an outer port 32 and inner port 36, with an internal cavity 34 extending between the ports. While only one channel is required for the present invention, two are preferred. Second channel 40, located within the second expanded region 25, is a mirror image of the first channel 30, with inner port 46, cavity 44, and outer port 42. In the first illustrated embodiment, a cable 50 is routed in through the first channel 30, wound around the medial region 20, and routed back out through the second channel 40.

Figure 5:
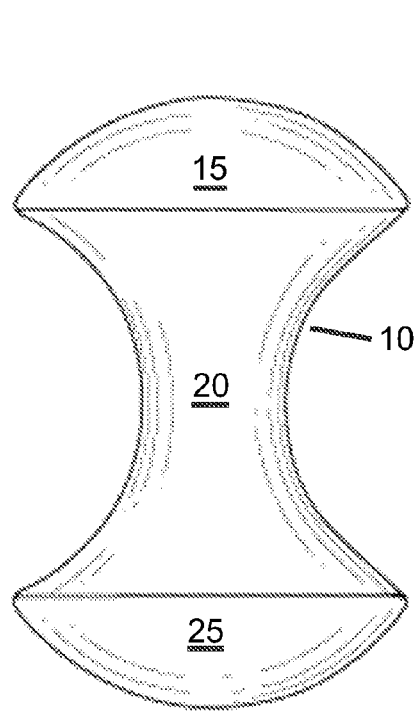
FIG. 5 is a rear plan view of the device of FIG. 1.
Figure 6:
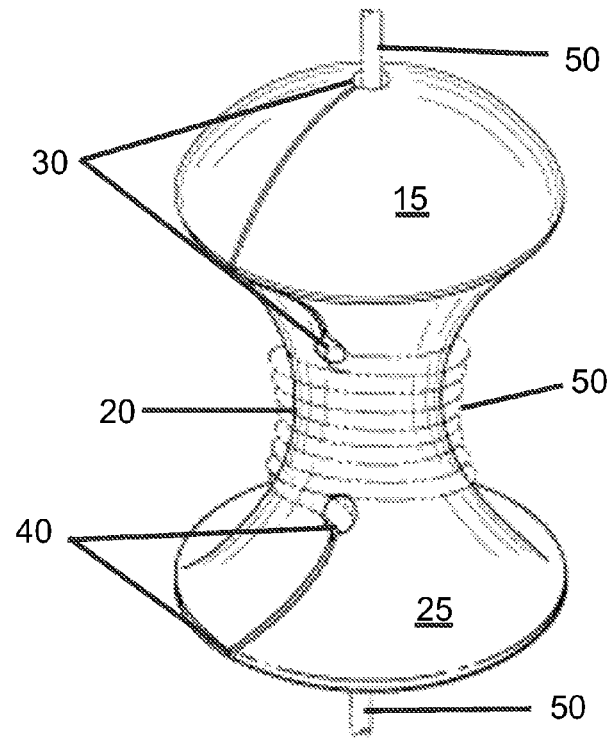
FIG. 6 is a perspective view of the device of FIG. 1 while in use.
Figure 8:
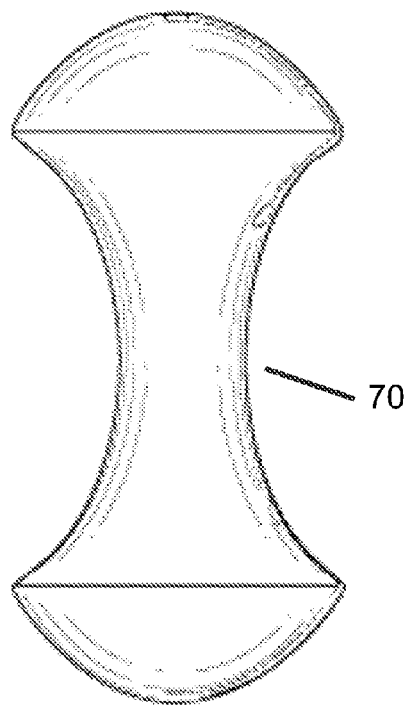
FIG. 8 is a left side plan view of the device of FIG. 7.
Figure 7:
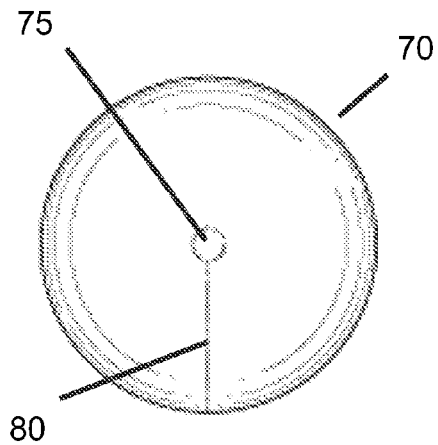
FIG. 7 is a top plan view of a second embodiment of the invention.
Figure 9:
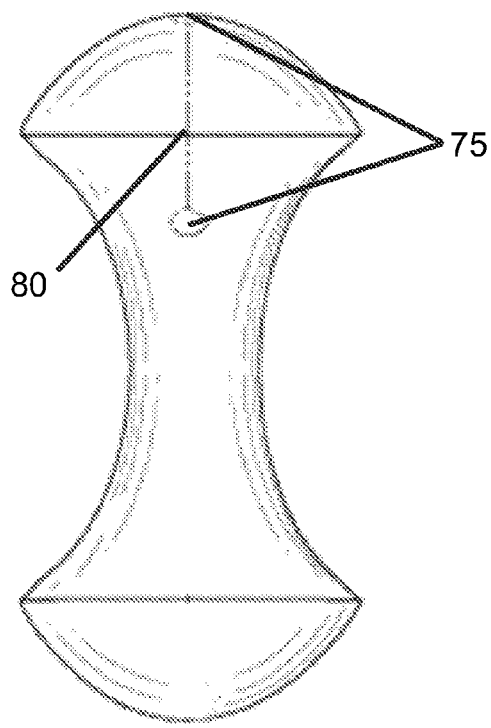
FIG. 9 is a front plan view of the device of FIG. 7, illustrating one channel and resealable slit.
Figure 10:
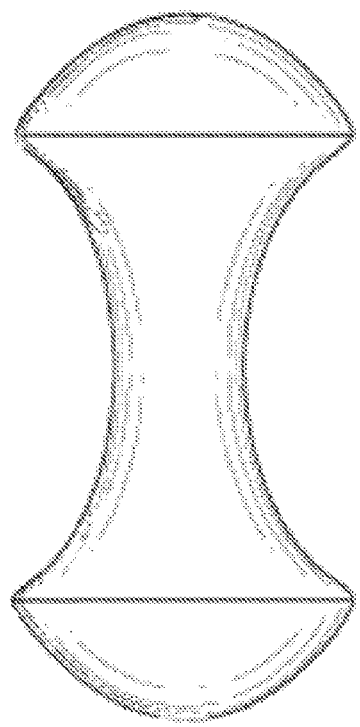
FIG. 10 is a left side plan view of the device of FIG. 7.
Figure 11:
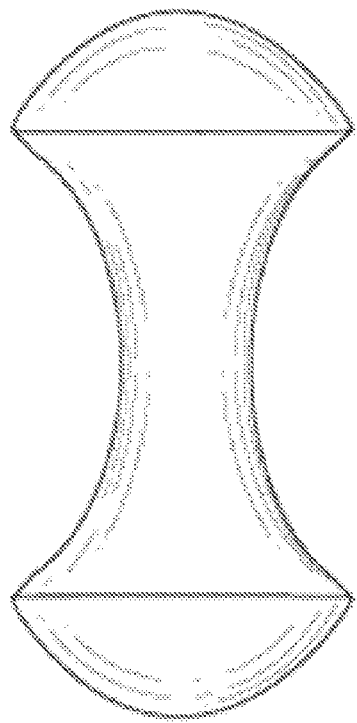
FIG. 11 is a rear plan view of the device of FIG. 7.
Figure 12:
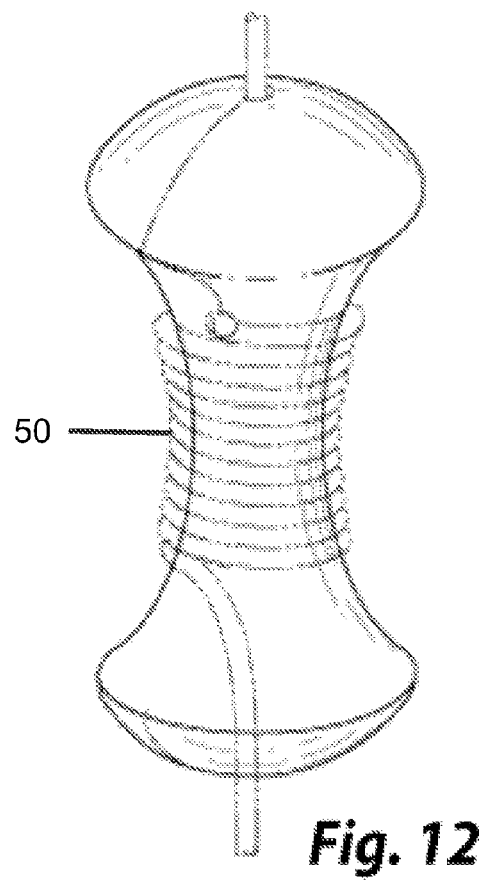
FIG. 12 is a perspective view of the device of FIG. 7 while in use.
Figure 13:
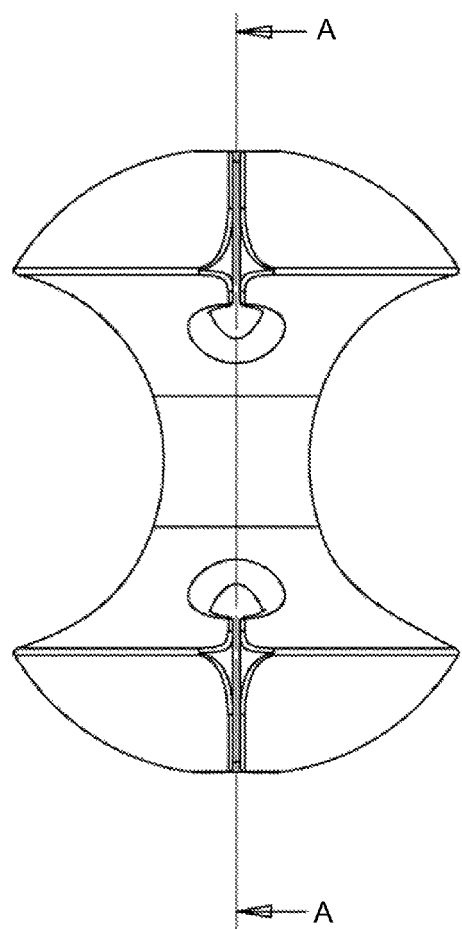
FIG. 13 is an enlarged front plan view of the device of FIG. 1.
Figure 14:
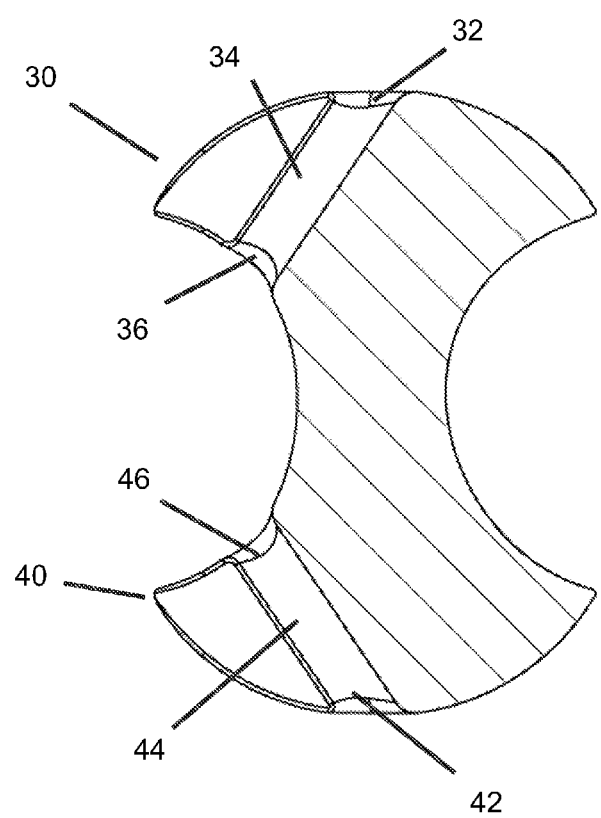
FIG. 14 is a sectional view of the device of FIG. 13, taken along line A-A.

Importantly, the first channel further includes a resealable slit 38. The slit 38 extends from the outer surfaces of the first expanded region 15 and the medial region 20 in to the internal cavity 34. The slit 38 may be opened to provide access to the internal cavity 34 by applying a separation force. Upon removal of the separation force, the slit 38 will automatically seal due to the elastomeric qualities of the material. Various well-known materials and methods may be used to provide the resealable functionality of the slit 38 including but not limited to compliant rubber composite materials. The second channel also includes a similar resealable slit 48. The slit openings 38, 48 are better shown in FIGS. 13 and 14.

In operation, a cable 50 may be routed through the first channel 30, wound around the medial region 20, and routed back out through the second channel 40. Using this configuration, a cable may be wrapped or wound a desired length to shorten the effective length of the cable. The first and second resealable slits 38, 48 reliably secure the cable into the internal cavities, 34, 44 of the channels 30, 40 preventing inadvertent unwinding. In addition, a cable is never forced to bend beyond certain angles that may cause degradation or transmission errors in transmitting cables.

Reference is next made to FIGS. 7 through 12, which illustrate an alternative embodiment of a cable management device, designated generally at 70, that includes only one channel 75 and resealable slit 80. In addition, the device 70 illustrates an alternative shape consistent with the present invention.

The durometer of the material for any embodiment of the invention may be adjusted to affect the hardness and/or softness of particular regions. In addition, the material composition may be altered to provide different resiliency properties of the channels and associated resealable slits. Likewise, various other overall shapes, curvatures, non-curvatures, and orientations of the device have been contemplated and are consistent with the teachings of the present invention.

Embodiments of the present invention may also be utilized as for storing non-conductive cords, especially in a household. Novelty expanded ends may be used to enhance the décor of a room while the functionality of the winding device stows drawstrings or other similar household cords.

Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. An in-line cable management device comprising:
   a top and a bottom expanded region each having a shape, the shape of at least one of the expanded regions being a novelty shape;
   a medial region disposed between the top and bottom expanded regions, wherein the medial region is cross-sectionally narrower than the top and bottom expanded regions and defines an inner side of each expanded region, an imaginary line passing centrally through the top and bottom expanded regions and the medial region being defined as an axis, a side of the top expanded region not proximate the medial region being defined as a top side, and a side of the bottom expanded region not proximate the medial region being defined as a bottom side;
   at least one channel extending from the top side of the top expanded region and toward the medial region, said channel terminating at a point defining the medial region, going through said top expanded region, along the axis; and
   a slit extending radially from and along the channel and through one side of the top expanded region to an outer circumference thereof, thereby providing access to the channel though the top expanded region;
   the entire device being manufactured from a deformable elastomeric material with shape memory such that in use the top expanded region will substantially part along the slit, exposing an entire length of the channel, when pressure is applied to said expanded region, and return to its original shape when said pressure is removed.

2. The device of claim 1, further comprising a second channel extending from the bottom side of the bottom expanded region and toward the medial region, said channel terminating at a point defining the medial region, going through said bottom expanded region, along the axis, and a second slit extending radially from and along the second channel and through one side of the bottom expanded region to an outer circumference thereof, thereby providing access to the second channel though the bottom expanded region.

3. An in-line cable management device comprising:
   a top and a bottom expanded region, each having a shape;
   a medial region disposed between the top and bottom expanded regions, wherein the medial region is cross-sectionally narrower than the top and bottom expanded regions and defines an inner side of each expanded region, a line passing centrally through the top and bottom expanded regions and the medial region being defined as an axis, a side of the top expanded region not proximate the medial region being defined as a top side, and a side of the bottom expanded region not proximate the medial region being defined as a bottom side;
   at least one channel extending from the top side of the top expanded region and toward the medial region, going through said top expanded region, along a direction of the axis yet forming a non-right angle with said axis commencing from a point on the top side of the top expanded region;
   a slit originating as a part of the channel and extending radially therefrom through one side of the top expanded region to an outer circumference thereof, defining left and right sides of the top expanded region, thereby providing access to the channel though the top expanded region; and
   the top expanded region being made of a deformable elastomeric material having a shape memory such that said top expanded region will deform under pressure, parting the left and right sides of the top expanded region about the slit and thereby exposing the channel along its entire length, and will return to its original shape when said pressure is removed.

4. The device of claim 3, further comprising a second channel extending from the bottom side of the bottom expanded region and toward the medial region, said channel terminating at a point defining the medial region, going through said bottom expanded region, along a direction of the axis yet forming a non-right angle with said axis commencing from a point on the top side of the top expanded region, and a second slit, originating as a part of the second channel and extending radially therefrom through one side of the bottom expanded region to an outer circumference thereof thereby providing access to the second channel though the bottom expanded region and defining left and right sides of the bottom expanded region, the bottom expanded region being made of an elastomeric material having a shape memory such that it will deform under pressure, parting the left and right sides of the bottom expanded region and thereby exposing the second channel along its entire length, and said bottom expanded region return to its original shape when said pressure is removed.

5. The device of claim 3, wherein the in-line cable management device is substantially shaped in the form of an archetypical apple core.

6. The device of claim 3, the top and bottom expanded regions being substantially bulbous.

7. The device of claim 3, the shape of the top and bottom expanded regions being selected from the set of three-dimensional shapes consisting of: spheres, hemispheres, cubes, pyramids, octahedrons, decahedrons, and, dodecahedrons.

8. The device of claim 3, the shape of at least one of the expanded regions being a novelty shape.

9. The device of claim 4, wherein the in-line cable management device is substantially shaped in the form of an archetypical apple core.

10. The device of claim 4, the top and bottom expanded regions being substantially bulbous.

11. The device of claim 4, the shape of the top and bottom expanded regions being selected from the set of three-dimensional shapes consisting of: spheres, hemispheres, cubes, pyramids, octahedrons, decahedrons, and, dodecahedrons.

12. The device of claim 4, the shape of at least one of the expanded regions being a novelty shape.

* * * * *